(12) United States Patent
Hepburn et al.

(10) Patent No.: US 11,920,914 B2
(45) Date of Patent: Mar. 5, 2024

(54) TUBING DIMENSIONAL MEASUREMENT SYSTEM

(71) Applicant: Corning Incorporated, Corning, NY (US)

(72) Inventors: Jerry Lee Hepburn, Corning, NY (US); Aniello Mario Palumbo, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 431 days.

(21) Appl. No.: 17/352,834

(22) Filed: Jun. 21, 2021

(65) Prior Publication Data

US 2021/0310797 A1 Oct. 7, 2021

Related U.S. Application Data

(62) Division of application No. 16/173,174, filed on Oct. 29, 2018, now Pat. No. 11,073,377.

(Continued)

(51) Int. Cl.
*G01B 11/08* (2006.01)
*C03B 23/047* (2006.01)
(Continued)

(52) U.S. Cl.
CPC .......... *G01B 11/08* (2013.01); *C03B 23/0476* (2013.01); *C03B 23/08* (2013.01); *G01B 11/06* (2013.01)

(58) Field of Classification Search
CPC ..... C03B 23/0476; C03B 23/08; G01B 11/06; G01B 11/08

(Continued)

(56) References Cited

U.S. PATENT DOCUMENTS 3,914,356 A 10/1975 Dembiak et al.
4,902,902 A 2/1990 Tole
(Continued)

FOREIGN PATENT DOCUMENTS

CN 1175683 A 3/1998
CN 2788124 Y 6/2006
(Continued)

OTHER PUBLICATIONS

Chinese Patent Application No. 201880077905.5, Office Action dated Jul. 22, 2021, 5 pages (English Translation Only), Chinese Patent Office.

(Continued)

*Primary Examiner* — Sunghee Y Gray
(74) *Attorney, Agent, or Firm* — F. Brock Riggs

(57) ABSTRACT

Provided herein are measurement systems including a micrometer assembly for receiving a length of tubing, the micrometer assembly including a plurality of non-contact optical micrometers disposed around the length of tubing for measuring an outer diameter (OD) at a first plurality of positions along a circumference of the length of tubing. The measurement system may further include a displacement gauge assembly for receiving the length of tubing from the optical micrometer assembly, the displacement gauge assembly including a plurality of non-contact gauges disposed around the length of tubing for measuring a wall thickness at a second plurality of positions along the circumference of the length of tubing. A controller receives the OD measurements and thickness measurements, and determines an inner diameter and a concentricity of the length of glass tubing based on an index of refraction of the length of glass tubing, the OD measurements, and the thickness measurements.

6 Claims, 14 Drawing Sheets

Related U.S. Application Data

(60) Provisional application No. 62/592,787, filed on Nov. 30, 2017.

(51) Int. Cl.
 *C03B 23/08* (2006.01)
 *G01B 11/06* (2006.01)

(58) Field of Classification Search
 USPC .......................................................... 356/635
 See application file for complete search history.

(56) References Cited

U.S. PATENT DOCUMENTS

| | | | |
|---|---|---|---|
| 5,094,600 | A | 3/1992 | Sikora |
| 5,160,978 | A | 11/1992 | Faville |
| 5,397,410 | A | 3/1995 | Handly |
| 6,091,500 | A | 7/2000 | Bahr et al. |
| 6,129,876 | A * | 10/2000 | Qin .......................... B29C 55/22 |
| | | | 264/235.6 |
| 6,516,636 | B1 | 2/2003 | Gaensicke et al. |
| 9,127,932 | B2 | 9/2015 | Fiorentini et al. |
| 9,243,893 | B2 | 1/2016 | Leconte |
| 2003/0029849 | A1 | 2/2003 | Trinks et al. |
| 2005/0230479 | A1 | 10/2005 | Chapman et al. |
| 2008/0198389 | A1 | 8/2008 | Yoo et al. |
| 2010/0141965 | A1 | 6/2010 | Schneider et al. |
| 2012/0095723 | A1 | 4/2012 | Bobasheva et al. |
| 2017/0167852 | A1 | 6/2017 | Miki |
| 2018/0023946 | A1 | 1/2018 | Elliot |

FOREIGN PATENT DOCUMENTS

| | | |
|---|---|---|
| CN | 101459032 A | 6/2009 |
| CN | 103308378 A | 9/2013 |
| CN | 103384813 A | 11/2013 |
| CN | 106885522 A | 6/2017 |
| DE | 19856892 A1 | 6/2000 |
| DE | 102012025610 A1 | 2/2014 |
| JP | 06-135730 A | 5/1994 |
| JP | 07-138038 A | 5/1995 |
| JP | 10-203835 A | 8/1998 |
| JP | 11-295058 A | 10/1999 |
| JP | 2003-019578 A | 1/2003 |
| JP | 2006-153545 A | 6/2006 |
| JP | 2007-132774 A | 5/2007 |
| JP | 2009-300181 A | 12/2009 |
| WO | 2012/117353 A2 | 9/2012 |
| WO | 2015/043554 A1 | 4/2015 |

OTHER PUBLICATIONS

Japanese Patent Application No. 2020-528885, Office Action, dated Nov. 2, 2022, 13 pages (7 pages of English Translation and 6 pages of Original Copy); Japanese Patent Office.
International Search Report and Writien Opinion PCT/US2018/063316 dated Feb. 28, 2019, 14 Pgs.

* cited by examiner

TUBING DIMENSIONAL MEASUREMENT SYSTEM

CROSS REFERENCE TO RELATED APPLICATION

This application is a divisional of U.S. patent application Ser. No. 16/173,174 filed on Oct. 29, 2018, which claims priority under 35 U.S.C. § 119 of U.S. Provisional Patent Application Ser. No. 62/592,787 filed on Nov. 30, 2017, the content of each of which are relied upon and incorporated herein by reference in their entireties.

FIELD

The present disclosure relates generally to the field of dimensional measurement systems and, more particularly, to a tubing measurement system determining dimensional characteristics of transparent glass tubing.

BACKGROUND

Conventionally, glass tubes may be made using a process commonly referred to as the "Danner process." In the Danner process, a continuous flow of molten glass is dispensed from a delivery device onto the outer surface of a mandrel, which is placed on a steel shaft rotating around its longitudinal axis. The mandrel is inclined in relation to the horizontal so that, under the forces of gravity, and due to the rotating motion of the mandrel, the molten glass progressively takes the shape of a tube. The glass is progressively cooled as it flows down the mandrel towards the downstream end. After exiting the mandrel at the downstream end, the preformed tube is drawn horizontally by a drawing machine while air is blown through the inside of the tube. In the Danner process, the molten glass that is in contact with the mandrel, i.e., the glass at the interface of the mandrel and the glass flow, goes on to form the interior surface of the glass tube.

Glass tubes may also be formed by a process commonly referred to as the "Vello process." In the Vello process, a glass tube is formed by flowing molten glass around a die (also referred to as a "bell head," or "bell") of a known diameter. The bell is positioned within an opening of a glass delivery tank containing molten glass using a bell positioning device. The bell positioning device may be used to adjust the position of the bell within the opening of the glass delivery tank such that tubing produced therefrom has a desired inner diameter and wall thickness (also referred to herein as "siding"). Once the bell is positioned within the opening of the glass delivery tank at the desired position, further movement of the bell within the opening may result in tubing siding variations. Unintentional bell movement can occur and result in tubing having more than the allowed variation in the siding. That is, the wall thickness of the resulting tubing is out of specification. Such tubing is discarded, resulting in decreased manufacturing efficiencies and increased manufacturing costs.

In an attempt to mitigate such tubing defects, some prior art approaches measure shape defects of the glass tube immediately downstream of the formation step, for example, by means of a "contactless" measurement, in order to intervene in the formation step just upstream of the measurement step. Furthermore, in some prior art approaches, the determination of the thickness of glass tubes may be used to obtain an indirect measure of the inner diameter of the tube, which is otherwise difficult to be measured on automatic production lines, due to the difficulty of putting sensor elements of measuring instruments within the tube.

Conventional measuring techniques used for measuring clear glass tube OD, ID and wall thickness are not sufficiently accurate, however. For example, measurements found using hand-calipers, or measurements found using a camera for capturing an image of the cut tubing before glazing, fail to measure accurate to less than 5 µm. Although single axis non-contact micrometers may be used, these types of micrometers are less reliable because the out-of-round (OOR) often affects the accuracy of the diameter reading.

It would therefore be desirable to provide a non-contact dimensional measurement system that ensures accurate measurements of OD, ID and wall thickness at multiple locations on a clear glass tube to provide feedback on dimensional characteristics of the glass tube.

SUMMARY

In one example of the present disclosure, a measurement system may include a micrometer assembly for receiving a length of tubing, the micrometer assembly including a plurality of non-contact optical micrometers disposed around the length of tubing, the plurality of non-contact optical micrometers measuring an outer diameter at each of a first plurality of positions along a circumference of the length of tubing. The measurement system may further include a displacement gauge assembly for receiving the length of tubing from the optical micrometer assembly, the displacement gauge assembly including a plurality of non-contact gauges disposed around the length of tubing, the plurality of non-contact gauges measuring a wall thickness at each of a second plurality of positions along the circumference of the length of tubing. The measurement system may further include at least one controller operable with the micrometer assembly and the displacement gauge assembly, the at least one controller receiving each of: the measurement of the outer diameter at each of the first plurality of positions along the circumference of the length of tubing, and the measurement of the wall thickness at each of the second plurality of positions along the circumference of the length of tubing.

In another example of the present disclosure, a tubing dimensional measurement system may include a micrometer assembly for receiving a length of glass tubing, the micrometer assembly including a plurality of non-contact optical micrometers disposed around the length of glass tubing, and the plurality of non-contact optical micrometers measuring an outer diameter at each of a first plurality of positions along a circumference of the length of glass tubing. The tubing dimensional measurement system may further include a displacement gauge assembly for receiving, downstream along a tube draw line, the length of glass tubing from the optical micrometer assembly, the displacement gauge assembly including a plurality of non-contact gauges each coupled to an adjustable gauge stage disposed around the length of glass tubing, and the plurality of non-contact gauges measuring a wall thickness at each of a second plurality of positions along the circumference of the length of glass tubing. The tubing dimensional measurement system may further include at least one controller operable to receive the measurement of the outer diameter at each of the first plurality of positions along the circumference of the length of glass tubing, and receive the measurement of the wall thickness at each of the second plurality of positions along the circumference of the length of glass tubing. The at least one controller is further operable to determine an inner diameter and a concentricity of the length of glass tubing from the measurement of the outer diameter at each of the first plurality of positions along the circumference of the length of glass tubing, and from the measurement of the wall thickness at each of the second plurality of positions along the circumference of the length of glass tubing, and generate a feedback signal to adjust a processing parameter of a tubing forming device, wherein the feedback signal is generated based on the inner diameter and a concentricity of the length of glass tubing.

In yet another example of the present disclosure, a method for measuring attributes of a length of tubing may include providing a micrometer assembly adjacent a displacement gauge assembly along a tube draw, the micrometer assembly including a plurality of non-contact optical micrometers disposed around a length of glass tubing, and the displacement gauge assembly including a plurality of non-contact gauges disposed around the length of glass tubing. The method may further include measuring, using the plurality of non-contact optical micrometers, an outer diameter at each of a first plurality of positions along a circumference of the length of glass tubing. The method may further include measuring, using the plurality of non-contact gauges, a wall thickness at each of a second plurality of positions along the circumference of the length of glass tubing. The method may further include determining an inner diameter and a concentricity of the length of glass tubing based on an index of refraction of the length of glass tubing, the measurement of the outer diameter at each of the first plurality of positions along the circumference of the length of glass tubing, and the measurement of the wall thickness at each of the second plurality of positions along the circumference of the length of glass tubing.

BRIEF DESCRIPTION OF THE DRAWINGS

Non-limiting embodiments of the present disclosure are described by way of example with reference to the accompanying figures, which may not be drawn to scale. In the figures, each identical or nearly identical component illustrated is typically represented by a single numeral. For purposes of clarity, not every component is labeled in every figure, nor is every component of each embodiment shown where illustration is not necessary to allow those of ordinary skill in the art to understand the disclosure. In the figures.

DETAILED DESCRIPTION

Figure 1:
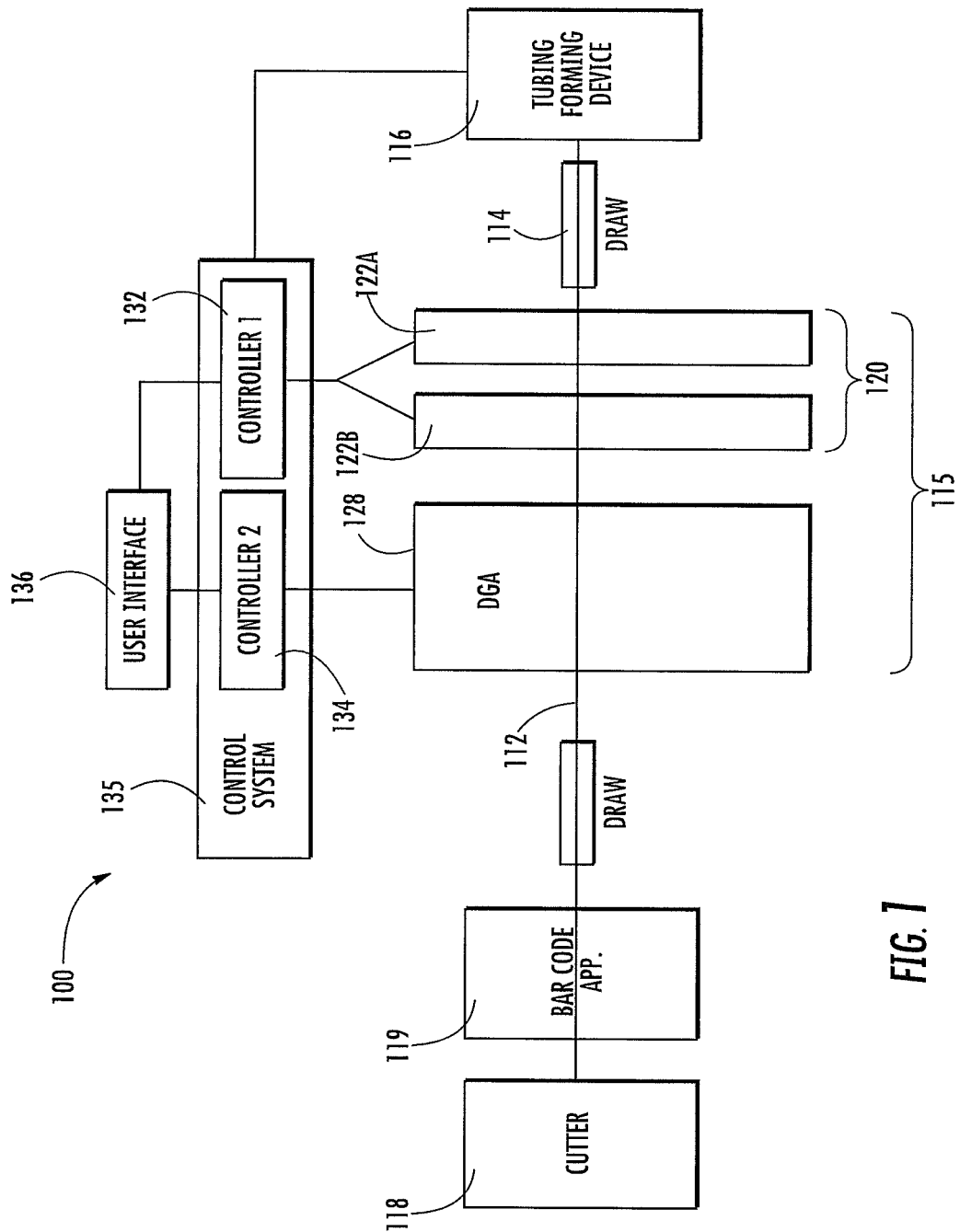
FIG. 1 is a block diagram of tube processing system according to embodiments of the present disclosure.

The terminology used herein is for the purpose of describing particular embodiments only, and is not intended to be limiting beyond the scope of the appended claims. Furthermore, the present disclosure is not limited to the particular embodiments described herein. Unless otherwise defined, all technical terms used herein have the same meaning as commonly understood by one of ordinary skill in the art to which the disclosure belongs.

The present disclosure relates to measurement systems including a micrometer assembly for receiving a length of tubing, the micrometer assembly including a plurality of non-contact optical micrometers disposed around the length of tubing for measuring an outer diameter at a first plurality of positions along a circumference of the length of tubing. The measurement system may further include a displacement gauge assembly for receiving the length of tubing from the optical micrometer assembly, the displacement gauge assembly including a plurality of non-contact gauges disposed around the length of tubing for measuring a wall thickness at a second plurality of positions along the circumference of the length of tubing. A controller receives the OD measurements and thickness measurements, and determines an inner diameter and a concentricity of the length of glass tubing based on an index of refraction of the length of glass tubing, the OD measurements, and the thickness measurements.

Various embodiments herein allow for non-contact measurement of transparent glass, including the ability to measure at 90 degree increments around the circumference of the tube while the tube is being drawn, or off-line after the tube has been cut. The measurement system of the present disclosure may be a combination of multiple monitoring components, which, together, output all of the dimensional characteristics for disposition and process feedback in the tube making process. The measurement system further has the capability to virtually align all of the measurements into one lengthwise location along the tube. For example, because it is not physically possible to have all of the components of each measurement system at the same lengthwise location due to physical space constraints, the measurement data is aligned to a same circumferential ring as if all of the instruments are in the same physical location.

In some embodiments, the plurality of measurement positions from the measurement system are rotationally spaced about the length of tubing. This way, it is possible to measure the thickness of the glass in more points angularly distant from each other, and to then obtain the variation of thickness of the tube in a circumferential direction, detecting potential shape defects, such as lack of concentricity between the internal and external surfaces of the length of tubing.

Alternatively, or in combination, the plurality of measurement positions may be longitudinally spaced from each other along the length of the tubing. As such, it is possible to measure the thickness of the length of tubing in more points longitudinally spaced from each other, thus increasing the number of measurement positions, and detecting such attributes as taper, average wall thickness, out-of-round, and others. In the case the length of tubing advances longitudinally along a tube draw, embodiments of the present disclosure may obtain the variation of thickness and OD of the length of tubing in both circumferential and longitudinal directions over time.

Based on the dimensional measurements, an output may be provided to a tubing forming device for controlling the production of the length of tubing. For example, on the basis of a detected wall thickness value, it may be possible to correct the shaping step of the length of tubing. In the case of continuous production of glass tubing that provides a casting orifice within which a tube shaping element is arranged, the output may provide feedback control of the position of the tube shaping element.

Turning now to FIG. 1, a tube processing system 100 according to embodiments of the disclosure will be described in greater detail. As shown, the tube processing system 100 operates on a length of tubing 112, which is drawn along one or more portions of a tube draw 114. The length of tubing 112 may be an elongated glass tube continuously drawn in a direction from a tubing forming device 116 towards a tube cutter 118 and, optionally, a barcode applicator 119. In some embodiments, the length of tubing 112 may be drawn without rotation. For the sake of explanation herein, the tubing forming device 116 may be considered "upstream" along the tube draw 114, while the tube cutter 118 may be considered "downstream" along the tube draw 114.

In some embodiments, the barcode applicator 119 is provided as part of the tube processing system to apply a barcode to the length of tubing 112, such as by laser etching or by application of a label along an exterior surface of the length of tubing 112. As shown, the barcode applicator 119 may be positioned downstream from a measurement system 115 along the tube draw 114, and upstream from the tube cutter 118. In other embodiments, the barcode applicator 119 may be positioned downstream of the tube cutter 118, for example, in the case that the barcodes are applied to the length of tubing 112 after cutting has been performed.

The tube processing system 100 may further include a micrometer assembly 120 of the measurement system 115, the micrometer assembly 120 configured to receive the length of tubing 112 from the tubing forming device 116 along the tube draw 114. In some embodiments, the micrometer assembly 120 may include a plurality of non-contact optical micrometers (hereinafter "micrometers") 122A-B disposed around the length of tubing 112 for measuring an outer diameter (OD) at each of a first plurality of positions along a circumference of the length of tubing 112. As will be described in greater detail below, the plurality of micrometers 122A-B may each be a high speed (e.g., 16000 samples/sec) dual-axis optical micrometer offset with respect to another so as to measure the OD at four (4) positions along a same circumferential ring along the length of tubing 112, e.g., 45 degrees apart.

The measurement system 115 may further include a displacement gauge assembly (DGA) 128 for receiving, downstream along the tube draw 114, the length of tubing 112 from the optical micrometer assembly 120. The displacement gauge assembly 128 may include a plurality of non-contact gauges (hereinafter "gauges") disposed around the length of tubing 112 for measuring a wall thickness at each of a second plurality of positions along the circumference of the length of tubing 112. As will be described in greater detail below, the plurality of gauges may each be laser triangulation gauges operable to measure wall thickness at four (4) points around the tube, e.g., 90 degrees apart. Such configuration of the plurality of gauges permits measurement of the wall thickness at four positions rotationally spaced from each other about the length of tubing 112 to determine a possible shape defect, in particular of non-concentricity between the inner and external surface of the length of tubing 112. In other embodiments, it may be possible to increase the number of measurement points along the circumference to increase the measurement precision and thus the reliability of the subsequent feedback control step of the production.

The tube processing system 100 may further include a control system 135, which is communicably coupled with the measurement system 115. In some embodiments, the control system 135 may include one or more controllers 132, 134 connected to the micrometer assembly 120 and the displacement gauge assembly 128, respectively, to receive signals representing the measurement of the OD at each of the first plurality of positions along the circumference of the length of tubing 112, and to receive signals representing the measurement of the wall thickness at each of the second plurality of positions along the circumference of the length of tubing 112. In some embodiments, the first controller 132 is provided to receive the OD measurements, while the second controller 134 is provided to receive the wall thickness measurements. Although not shown, the tube processing system 100 may further include one or more storage devices, such as a high-speed database, to store and retrieve the OD measurements and the wall thickness measurements.

In other embodiments, a single controller may receive and process all dimensional measurements observed by the measurement system 115. Connected to the first controller 132 and the second controller 134 may be a user interface (UI) 136, which may display feedback from the measurement system 115 to an operator. The UI 136 may include various other peripheral input and output devices, such as speakers, printers, keyboards, and so forth. In various embodiments, the UI 136, the first controller 132, and the second controller 134 may be positioned in close proximity to the measurement system 115, or may be located remotely from one another.

It will be appreciated that the first and second controllers 132, 134 may each include any electronic device capable of receiving, processing, and sending information related to the dimensional measurement characteristics or attributes of the length of tubing 112. Examples of an electronic device may include, without limitation, a computer, a personal computer (PC), a desktop computer, a laptop computer, a notebook computer, a netbook computer, a handheld computer, a tablet computer, a server, a server array or server farm, a web server, a network server, an Internet server, a work station, a main frame computer, a supercomputer, a network appliance, a web appliance, a distributed computing system, multiprocessor systems, processor-based systems, wireless access point, base station, subscriber station, radio network controller, router, hub, gateway, bridge, switch, machine, or combination thereof. Embodiments herein are not limited in this context.

The first and second controllers 132, 134 may execute processing operations or logic for the determination of the dimensional measurement characteristics or attributes of the length of tubing 112. The first and second controllers 132, 134 may each comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 2:
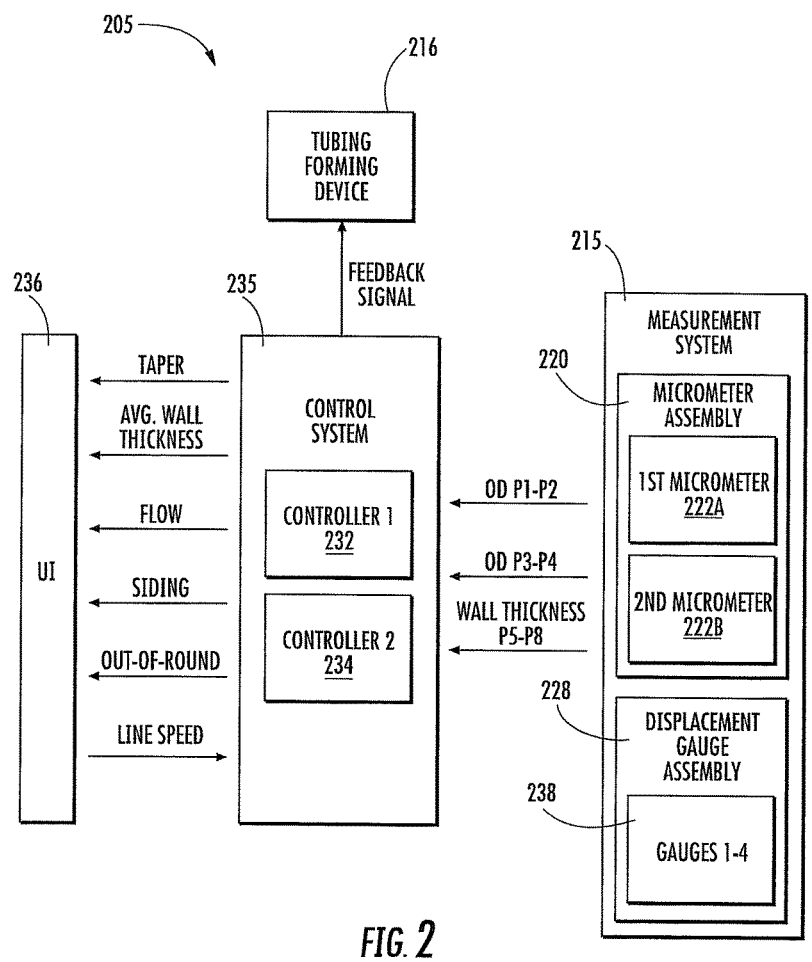
FIG. 2 is a block diagram of a tubing dimensional measurement system according to embodiments of the present disclosure.
Figure 3:
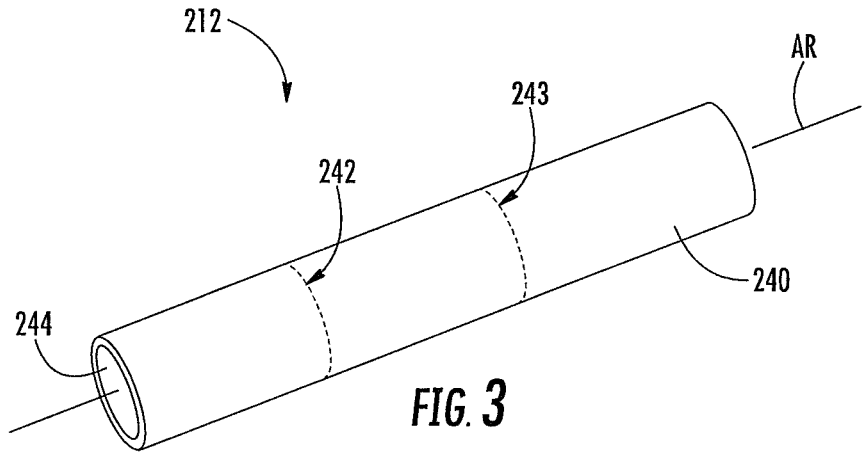
FIG. 3 is a perspective view of a length of tubing according to embodiments of the present disclosure.

Turning now to FIGS. 2-3, a tubing dimensional measurement system 205 according to embodiments of the disclosure will be described in greater detail. As shown, the tubing dimensional measurement system 205 may include the measurement system 215, which is connected with the first controller 232 and the second controller 234 of the control system 235, as well as the UI 236. In some embodiments, the micrometer assembly 220 may be provided adjacent the displacement gauge assembly 228 along the tube draw (FIG. 1) such that the first micrometer 222A and the second micrometer 222B are disposed around the length of tubing 212. The plurality of gauges 238 may also be disposed around the length of tubing 212, downstream of the first and second optical micrometers 222A-B.

During use, the first micrometer 222A and the second micrometer 222B may together measure an OD at a first plurality of positions around a circumferential ring 242 extending along an outer surface 240 of the length of tubing 212. In some embodiments, the positions are approximately 45 degrees apart from one another. As the length of tubing 212 continues downstream along the tube draw, the plurality of gauges 238 may then measure a wall thickness at each of a second plurality of positions also along the circumferential ring 242. Because the plurality of gauges 238 are positioned downstream from the first and second micrometers 222A-B, the first plurality of positions and the second plurality of positions may all be taken at the same lengthwise circumferential location along the length of tubing 212. The control system 235 may receive the line speed of the tube draw so that the OD and wall thickness measurement data may be aligned as if the sensors are in the same physical location.

In some embodiments, the plurality of gauges 238 and the first and second micrometers 222A-B may be virtually aligned based on a pre-determined or calculated physical distance between each of the measurement devices along the length of tube draw. For example, a first measurement may be recorded by the first micrometer 222A, and associated with a lengthwise position point, for example, by the first controller 232. Based on the known distance between the first micrometer 222A and the second micrometer 222B, as well as the known line speed of the length of tubing 212, arrival of the lengthwise position point at the second micrometer 222B at a subsequent point in time can be predicted and used to associate a second measurement recorded by the second micrometer 222B with the lengthwise position point. Similarly, a third measurement may be recorded by the plurality of gauges 238, and associated with the lengthwise position point, for example, by the second controller 234. Based on the known distance between the second micrometer 222B and the plurality of gauges 238, as well as the known line speed of the length of tubing 212, arrival of the lengthwise position point at the plurality of gauges 238 at a subsequent point in time can be predicted and used to associate the third measurement recorded by the plurality of gauges 238 with the lengthwise position point. As a result, each of the first, second, and third measurements are being made at the same lengthwise position point of the length of tubing 212 to "virtually align" all of the individual measurement components.

To determine various other dimensional attributes of the length of tubing 212, the first micrometer 222A and the second micrometer 222B of the measurement system 215 may together measure the OD and the wall thickness at a plurality of positions around a second circumferential ring 243 extending along the outer surface 240 of the length of tubing 212, for example, upstream of the circumferential ring 242. In various embodiments, the measurement system 215, in combination with the control system 235, may determine an average wall thickness for the length of tubing 212, for example, from the measured wall thickness at the four positions around the circumferential ring 242 and at four corresponding positions along the second circumferential ring 243. Alternatively, the average wall thickness may be computed according to a combination of the wall thickness over eight (8) positions along the circumferential ring 242 and the second circumferential ring 243. The measurement system 215 and the control system 235 may further determine a flow, which is determined based on the line speed of the tube draw, for example, on a 10 second running average, reported as pounds/hour, as well as a siding, which may be calculated by subtracting the minimum wall thickness from the maximum wall thickness for one or more selected measurement positions. The measurement system 215 and the control system 235 may further determine an out-of-round for the length of tubing 212, which may be present when diameter differences for the circumferential ring 242 or the second circumferential ring 243 are detected. The measurement system 215 and the control system 235 may also measure a taper along the outer surface 240 of the tubing 212, for example, by determining the cross-sectional area of the length of tubing 212 at each of the measurement locations and subtracting the overall minimum ID or OD from the overall maximum ID or OD, respectively.

The first controller 232 and the second controller 234 are configured to determine an ID of an inner surface 244 and a concentricity of the length of tubing 212 based on the OD measurements at the first plurality of positions, the wall thickness measurements at the second plurality of positions, and an index of refraction for the glass of the length of tubing 212, which may be supplied to the control system 235. For example, the wall thickness at a selected position may be subtracted from the measured OD at the same selected position to calculate an inner diameter. In some embodiments, the control system 235 is operable to determine the ID and the concentricity of the length of tubing 212 at a plurality of predetermined intervals (e.g., 10 ms) as the length of tubing 212 is drawn through the micrometer assembly 220 and the displacement gauge assembly 228. Advantageously, the control system 235 is able to determine the ID and the concentricity of the length of tubing 212 without rotation of the length of tubing 212, for example, about a central axis of rotation 'AR' extending lengthwise through the length of tubing 212.

Figure 4:
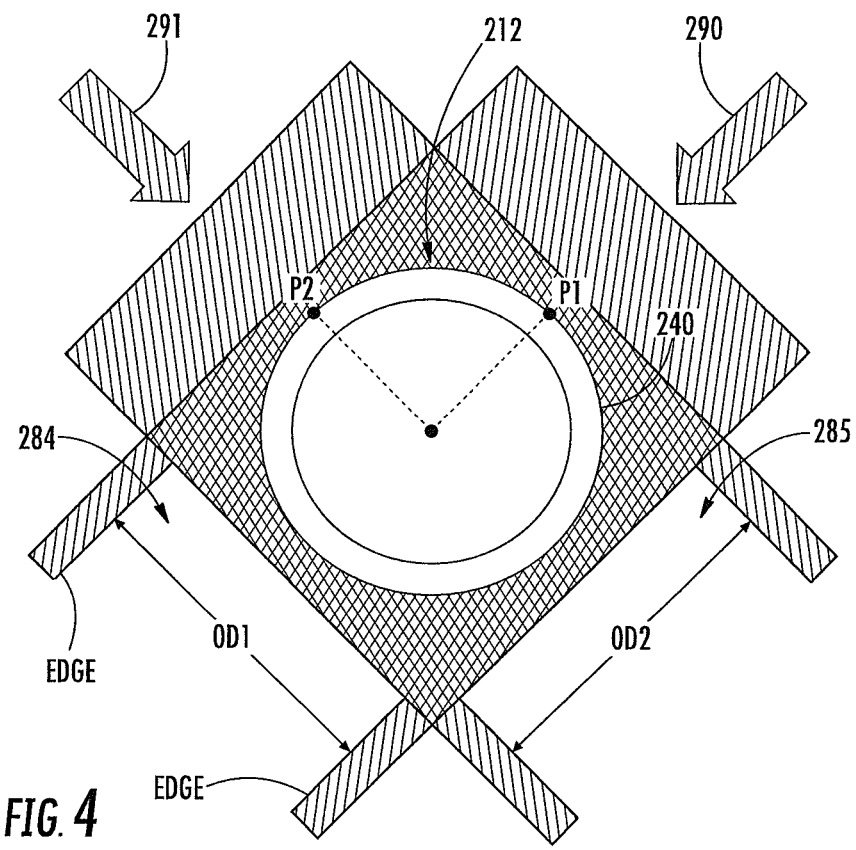
FIGS. 4-5 depict operation of a micrometer assembly according to embodiments of the present disclosure.

Turning now to FIG. 4, operation of the first micrometer 222A (FIG. 2) according to embodiments of the present disclosure will be described in greater detail. As shown, the first micrometer 222A is positioned around the length of tubing 212 so as to determine the OD at two positions, P1 and P2, which are located approximately 90 degrees apart from one another along a circumferential ring (e.g., circumferential ring 242 of FIG. 3). During operation, with the length of tubing 212 placed within a central area of the first micrometer 222A, first and second irradiated light beams 290, 291, such as one or more LED beams, are directed towards the outer surface 240 of the length of tubing 212. The profile of the length of tubing 212 generates a first shadow 284 and a second shadow 285 where the first and second irradiated light beams 290, 291 are blocked by the length of tubing 212. The boundary between an area where light passes by the outer surface 240 of the length of tubing 212 and where it is shaded is called an edge. First and second receivers (not shown) of the first micrometer 222A receive the first and second irradiated light beams 290 and 291 to determine OD1 and OD2, respectively, by measuring the distance between the edges of each of the first shadow 284 and the second shadow 285.

Figure 5:
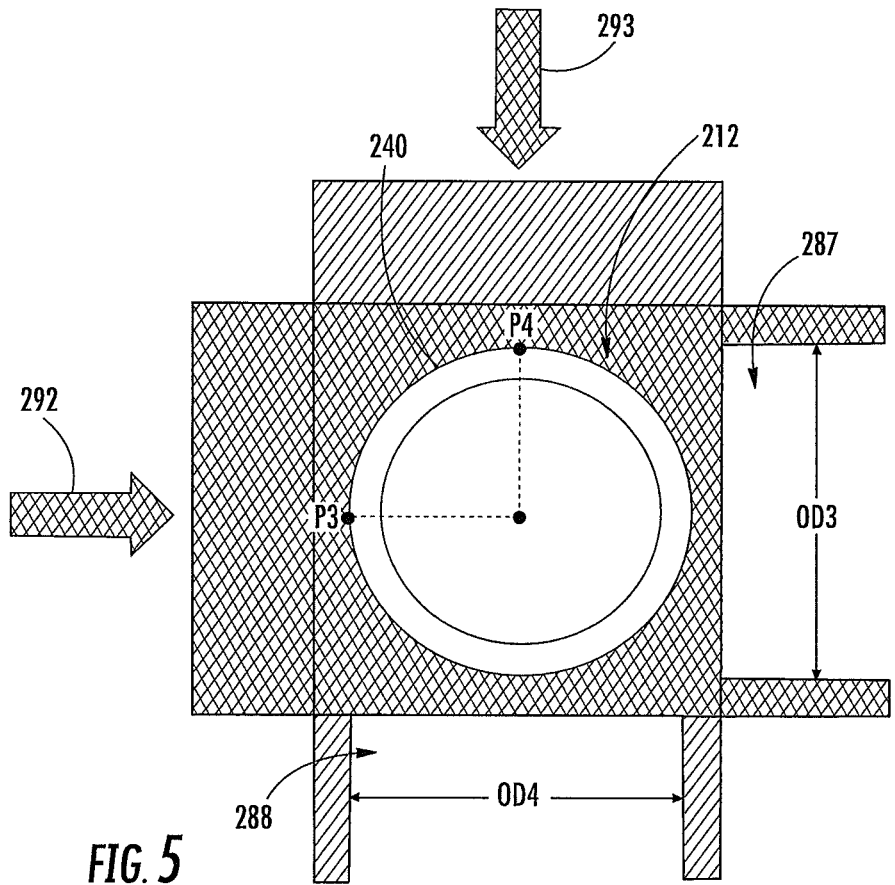

Similarly, as shown in FIG. 5, the second micrometer 222B (FIG. 2) is positioned around the length of tubing 212 so as to determine the OD at two positions, P3-P4, which are located approximately 90 degrees apart from one another along the circumferential ring 242 (FIG. 3). With the length of tubing 212 placed within a central area of the second micrometer 222B, third and fourth irradiated light beams 292, 293, such as one or more LED beams, are directed towards the outer surface 240 of the length of tubing 212. The profile of the length of tubing 212 generates a third shadow 287 and a fourth shadow 288 where the third and fourth irradiated light beams 292, 293 are blocked. First and second receivers (not shown) of the second micrometer 222B receive the third and fourth irradiated light beams 292 and 293, respectively, and determine OD3 and OD4 by measuring the distance between the edges of each of the third shadow 287 and the fourth shadow 288.

Figure 6:
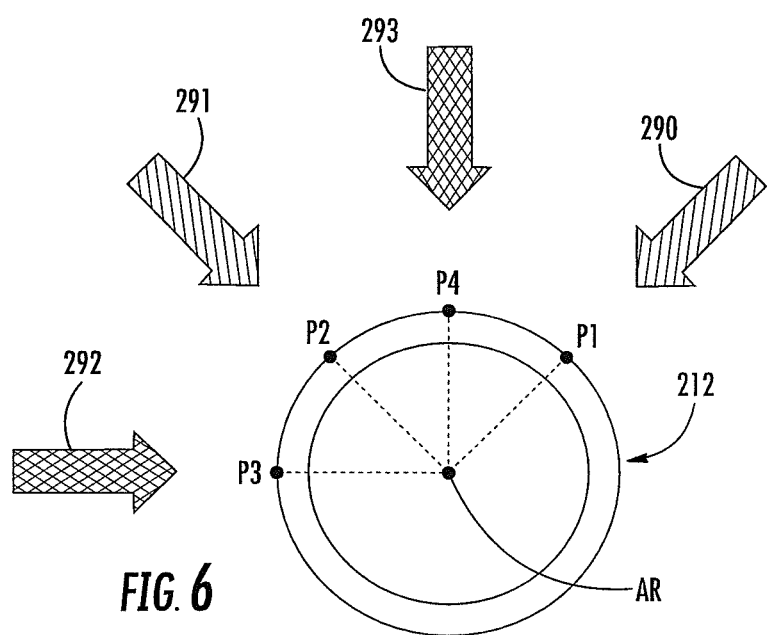
FIG. 6 depicts operation of a displacement gauge assembly according to embodiments of the present disclosure.

In some embodiments, as shown in FIG. 6, the first micrometer 222A (FIG. 2) and the second micrometer 222B are angled or rotated with respect to one another about the axis of rotation 'AR' extending lengthwise through the center of the length of tubing 212. As a result, each position P1-P4 is spaced apart from a directly adjacent position by 45 degrees, or approximately 45 degrees. For example, as shown, P1 is 45 degrees from P4, which is 45 degrees from P2. Similarly, P3 is 45 degrees from P2. The OD measurement at positions P1-P4 may then be returned to the first controller 232 of the control system 235.

Figure 7:
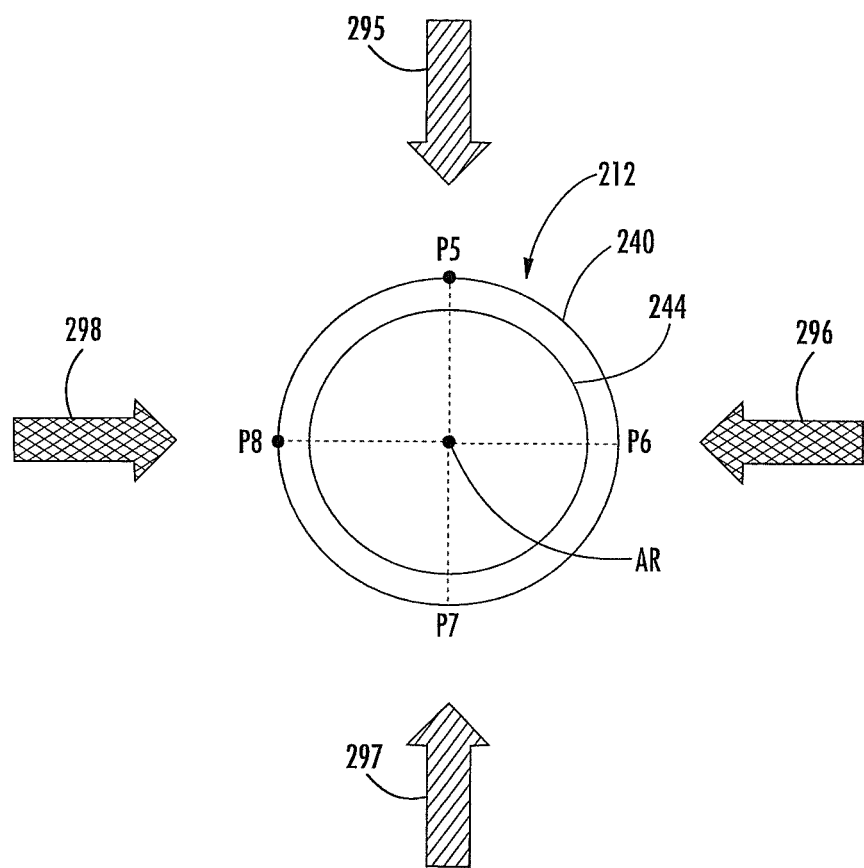
FIG. 7 depicts operation of the micrometer assembly and the displacement gauge assembly according to embodiments of the present disclosure.

Turning now to FIG. 7, measurement of the wall thickness of the length of tubing 212 according to embodiments of the disclosure will be described in greater detail. The plurality of gauges 238 (FIG. 2) may output lasers 295-298, which are directed towards the outer surface 240 of the length of tubing 212. The light emitted from the lasers 295-298 to the transparent length of tubing 212 is reflected off both the outer surface 240 and the inner surface 244 thereof. The reflections off the outer surface 240 and the inner surface 244 are separately identified to measure the distance between the two, thus providing a thickness measurement.

In some embodiments, the plurality of gauges 238 may be laser triangulation gauges for measuring wall thickness at four (4) points, P5-P8, located around the length of tubing 212, for example, 90 degrees apart. In some cases, the laser 295-298 may be projected by a cylindrical lens (not shown) and diffusely reflected on the length of tubing 212. This reflected light may be formed on a HSE3-CMOS and, by detecting changes in position and shape of the reflected light, displacement and shape of the length of tubing 212 are measured. Furthermore, the plurality of gauges 238 may be mounted on x-y stages that automatically adjust to keep each of the lasers 295-298 at the peak of the arc along the outer surface 240 of the length of tubing 212. The wall thickness measurement at each of positions P5-P8 may then be returned to the second controller 234 (FIG. 2).

In some embodiments, each of the plurality of gauges 238 delivers an output signal to the second controller 234, which is operable to run a predetermined algorithm including a Discrete Fourier Transform (DFT) to determine a wall thickness at each of positions P5-P8. The DFT may specify the relationship between the index of refraction and the measured wall thickness of the length of tubing 212, as well as the wavelength of the lasers 295-298 and the angle of incidence, which may be orthogonal to the length of tubing 212. The index of refraction may be supplied to the second controller 234, and is dependent upon the composition of the glass of the length of tubing 212. In one example, to determine the index of refraction, the plurality of gauges 238 are calibrated using a sample flat glass that has a similar index of refraction of the tubing glass under test. The sample flat glass and the length of tubing 212 under test may be of two (2) different thicknesses, and may be measured using calibrated NIST traceable mechanical micrometers. Each piece of glass may then be measured by the plurality of gauges 238, and a slope is calculated by the second controller 234 to determine the index of refraction for the length of tubing 212.

Wall thickness may then be determined according to the following equation:

$$\Delta \lambda = -\frac{\lambda o^2}{2sn} \text{ or } \Delta f = \frac{c_o}{2sn}$$

where $\lambda_0$ is the wavelength of the light source, n is the index of refraction of the transparent glass, s is the wall thickness of the length of tubing 212 between the inner surface 244 and the outer surface 240, $c_0$ is the light speed, and $\Delta \lambda$ or $\Delta f$ is the advancement rate of the length of tubing 212.

Figure 8:
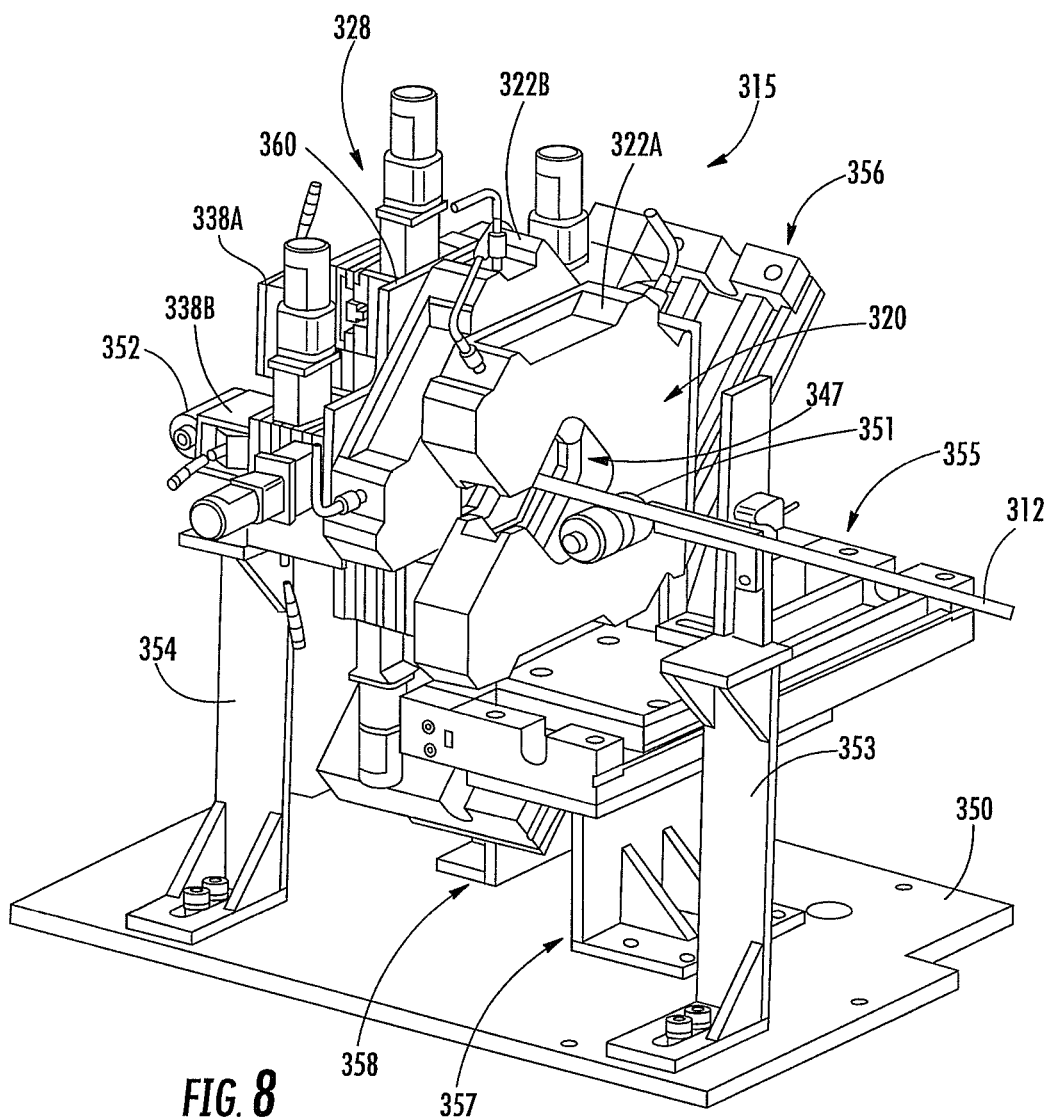
FIGS. 8-10 depict perspective views of a measurement system according to embodiments of the present disclosure.
Figure 9:
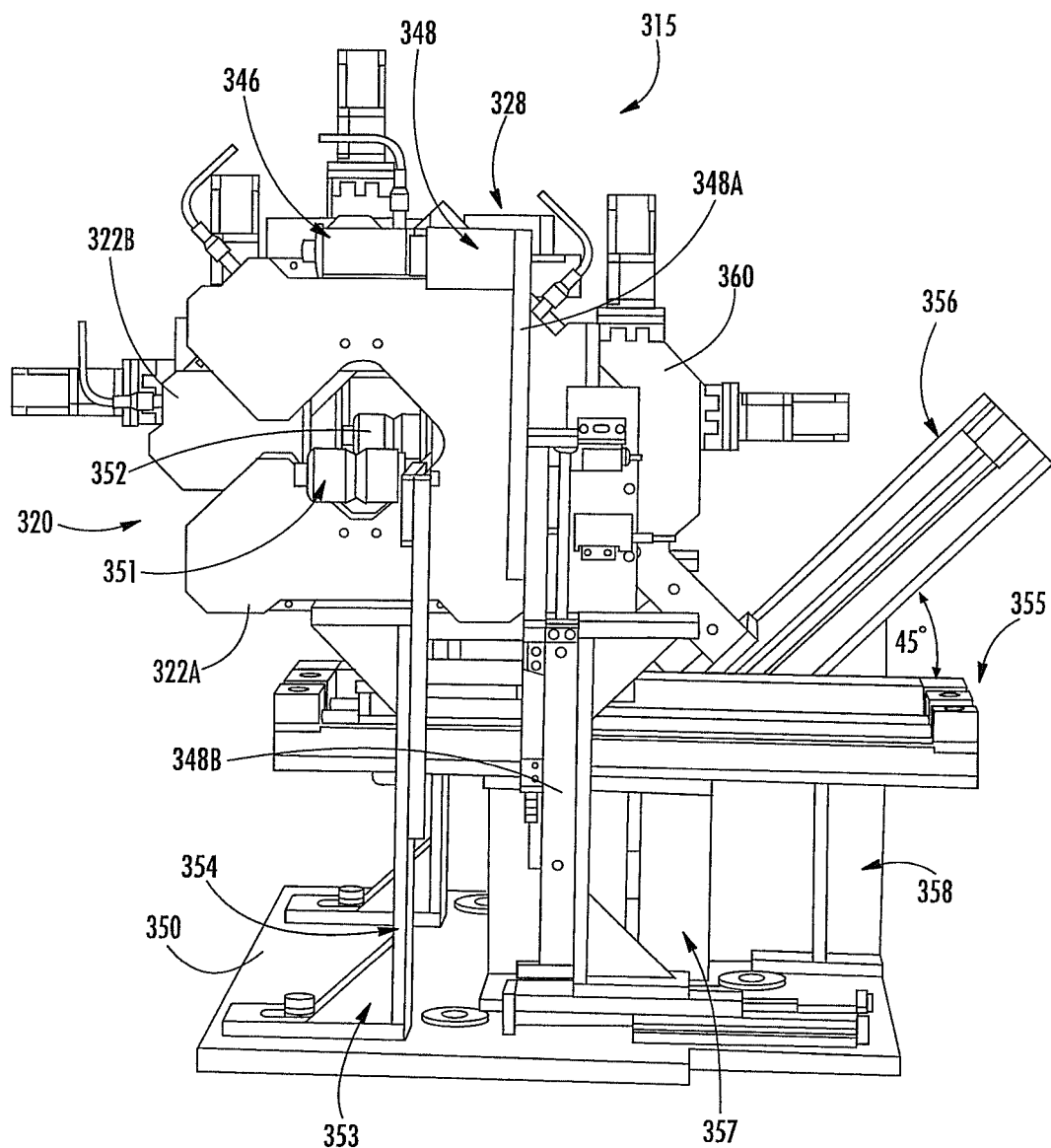
Figure 10:
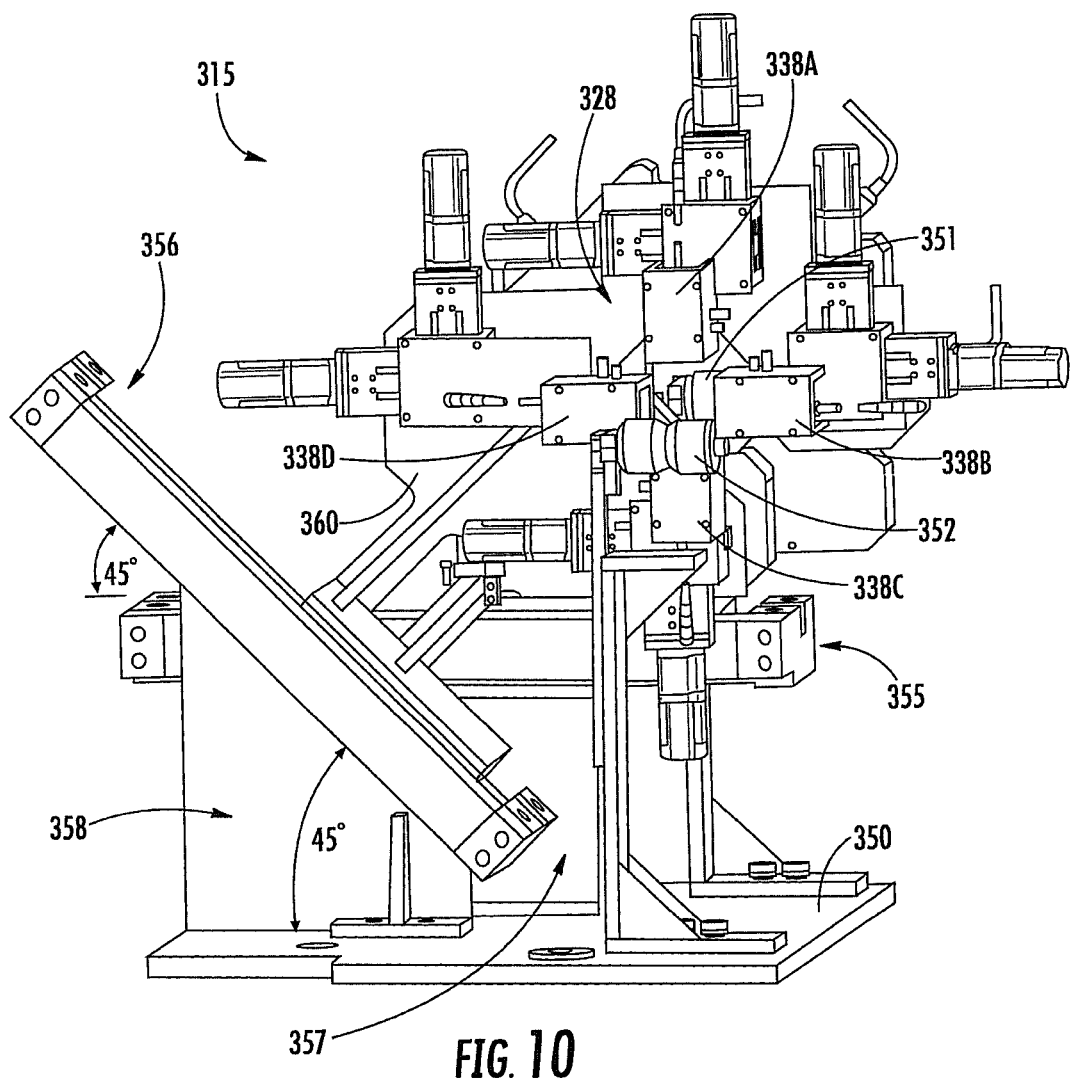

Turning now to FIGS. 8-10, a measurement system 315 according to embodiments of the present disclosure will be described in greater detail. The measurement system 315 may be the same or similar to the measurement system 115 and the measurement system 215 described above. As shown, the measurement system 315 may include the micrometer assembly 320 for receiving the length of tubing 312, which may be clear glass or amber-colored glass. The micrometer assembly 320 includes the first micrometer 322A and the second micrometer 322B positioned directly adjacent one another, together providing a central opening 347 for receiving the length of tubing 312 therein. In some embodiments, the first and second micrometers 322A-B are placed as close together as physically possible while still allowing enough space for each to slide out of the way independently. The micrometer assembly 320 may be mounted atop a base platform 350, as shown. During use, the length of tubing 312 may be supplied to the central opening 347 via an entrance roller 351, and delivered from the measurement system 315 by an exit roller 352. The entrance roller 351 may be supported by a first roller support 353 coupled to the base platform 350, and the exit roller 352 may be similarly supported by a second roller support 354 coupled to the base platform 350. One or more upper rollers 346 (FIG. 9) may be provided to press the length of tubing 312 against the entrance roller 351 and/or the exit roller 352 to ensure the length of tubing 312 is at the bottom of the v-shaped groove to reduce any misalignment, which causes measurement drop-outs from a plurality gauges 338A-D disposed around the length of glass tubing 312. The upper roller 346 may have a substantially uniform cylindrical shape, and/or the upper roller 346 may include one or more v-shaped grooves configured to engage the length of tubing 312.

In some embodiments, the upper roller 346 may be supported by an upper roller support 348 coupled to the base platform 350, the upper roller support 348 being adjustable (e.g., up and down) to bring the upper roller 346 closer or further from the entrance roller 351. For example, the upper roller support 348 may include a first section 348A coupled to a second section 348B. An actuator (e.g., a shaft) 341 coupled between the first and second sections 348A-B may retract into and extend out of the second section 348B to adjust the first section 348A relative to the second section 348B. In some embodiments, another upper roller (not shown) may be positioned opposite the exit roller 352 for maintaining position of the length of tubing 312 after it passes through the measurement system 315. In some embodiments, the entrance roller 351 and the exit roller 352 are used for tube positioning. For example, the entrance roller 351 and the exit roller 352 may each include a v-shaped groove, and provide tube centering of the plurality gauges 338A-D disposed around the length of glass tubing 312. In some embodiments, each of the x-y stages (not shown) supporting the plurality of gauges 338A-D may be referenced to the plurality of gauges 338A-D by the entrance roller 351 and the exit roller 352. A "teach" or reference position may be created and stored in the control system, so that a movement detected in any of the plurality of gauges 338A-D can be translated to a corresponding move in 'x' and/or 'y' on the stages.

As shown, the first micrometer 322A is mounted on a first micrometer stage 355, while the second micrometer 322B is mounted on a second micrometer stage 356. In some embodiments, the second micrometer stage 356 is oriented at an angle of 45 degrees, or approximately 45 degrees, relative to the first micrometer stage 355. The second micrometer stage 356 may therefore also be oriented at an angle of 45 degrees relative to the base platform 350, which is parallel to the first micrometer stage 355, as well as to the floor (not shown). The first micrometer stage 355 and the second micrometer stage 356 may be coupled to the base platform 350 by respective first and second stage supports 357 and 358. As will be described in greater detail below, the first and second micrometer stages 355, 356 may be moveable relative to the first and second stage supports 357 and 358, respectively.

The measurement system 315 may further include the displacement gauge assembly 328 for receiving, downstream along the tube draw, the length of glass tubing 312 from the optical micrometer assembly 320. As shown, the displacement gauge assembly 328 may include the plurality gauges 338A-D disposed around the length of glass tubing 312. The plurality of gauges 338A-D may measure a wall thickness at various positions along the circumference of the length of glass tubing 12, as will be described in greater detail below. The plurality of gauges 338A-D may be directly mechanically coupled to a bracket 360 mounted to the second micrometer stage 356. In some embodiments, the second micrometer 322B may also be directly mechanically coupled to the bracket 360, for example, on an opposite side from the plurality of gauges 338A-D.

Figure 11:
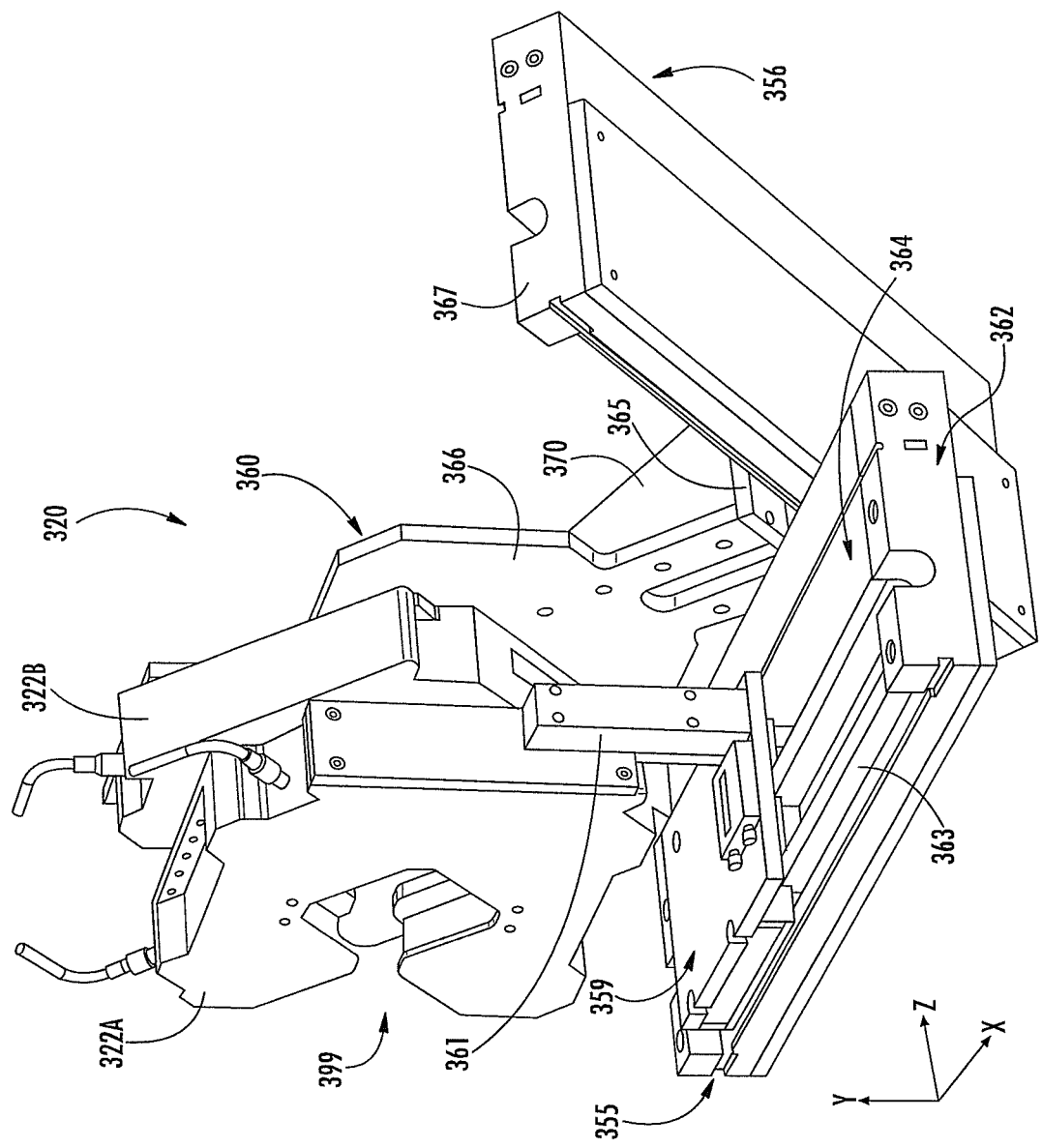
FIGS. 11-12 depict perspective views of a micrometer assembly of the measurement system of FIGS. 8-10 according to embodiments of the present disclosure.
Figure 12:
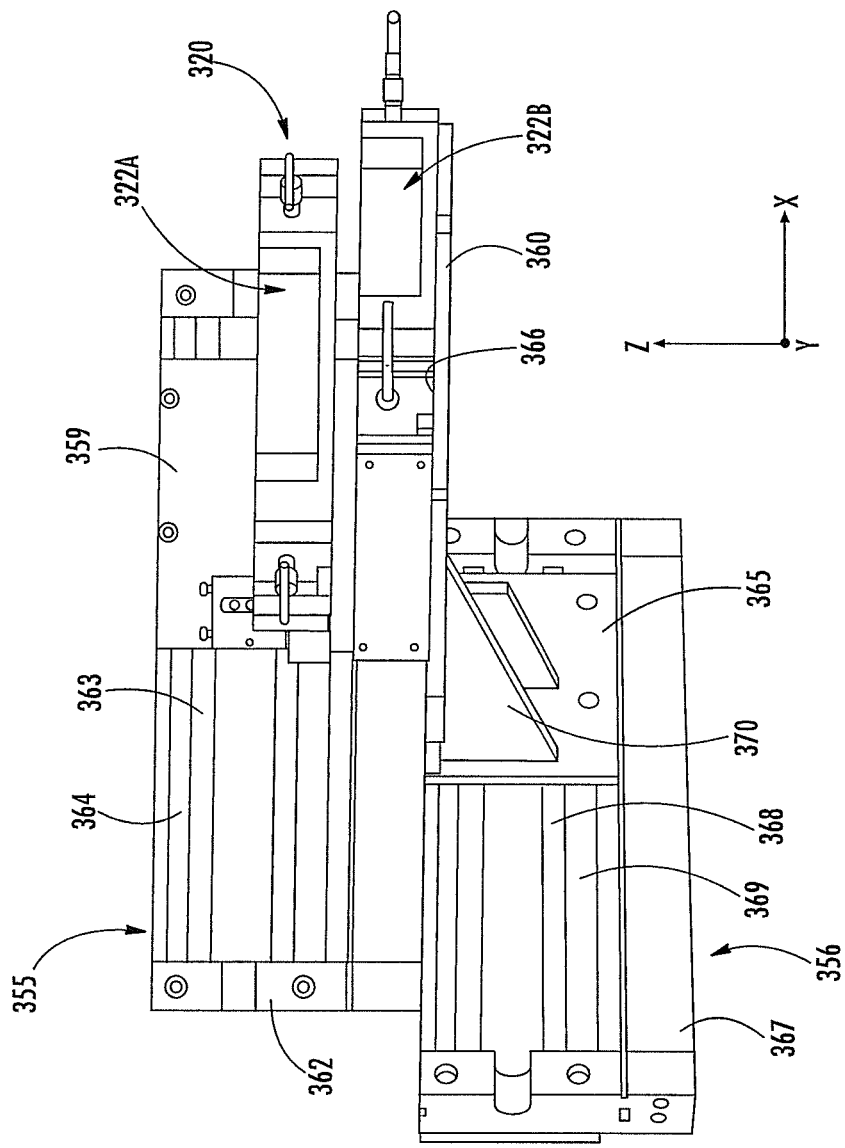

Turning now to FIGS. 11-12, the micrometer assembly 320 according to embodiments of the present disclosure will be described in greater detail. As shown, the micrometer assembly 320 includes the first micrometer 322A positioned directly adjacent the second micrometer 322B. The first and second micrometers 322A-B may each be a high speed (e.g., 16000 samples/sec) dual-axis optical micrometer offset with respect to another so as to measure the OD at four (4) positions along a same circumferential ring about the length of tubing (not shown). The first micrometer 322A may be coupled to the first micrometer stage 355 by a side bracket 361, which extends perpendicularly from a first sled 359 of the first micrometer stage 355. In some embodiments, the first micrometer stage 355 may include a first platform 362 containing a series of alternating rails 363 and grooves 364 extending along a length of the first micrometer stage 355 (e.g., in the x-direction). The first sled 359 is configured to matingly engage with the rails 363 and grooves 364 of the first platform 362, permitting the first sled 359 to slide along the x-direction relative to the first platform 362. The first micrometer 322A may include an opening 399 along at least one side to allow the first micrometer 322A to slide in and out of position while the length of tubing is in place.

Similarly, the second micrometer 322B may be coupled to the second micrometer stage 356 by the bracket 360, which extends from a second sled 365. The second micrometer 322B may be directly physically coupled to a first side (i.e., upstream side) 366 of the bracket 360. In some embodiments, the bracket 360 may include a set of support braces 370 extending from the second sled 365 to provide stability and rigidity. As shown, the second micrometer stage 356 may include a second platform 367 containing a series of alternating rails 368 and grooves 369 extending along a length of the first micrometer stage 355. The second sled 365 is configured to matingly engage with the rails 368 and grooves 369 of the second platform 367, permitting the second sled 365 to slide relative to the second platform 367. The second micrometer 322B may include an opening along at least one side to allow the second micrometer 322B to slide in and out of position while the length of tubing is in place. As shown, the second platform 367 is oriented at an angle (e.g., 45 degrees) relative to the first platform 355.

Figure 13:
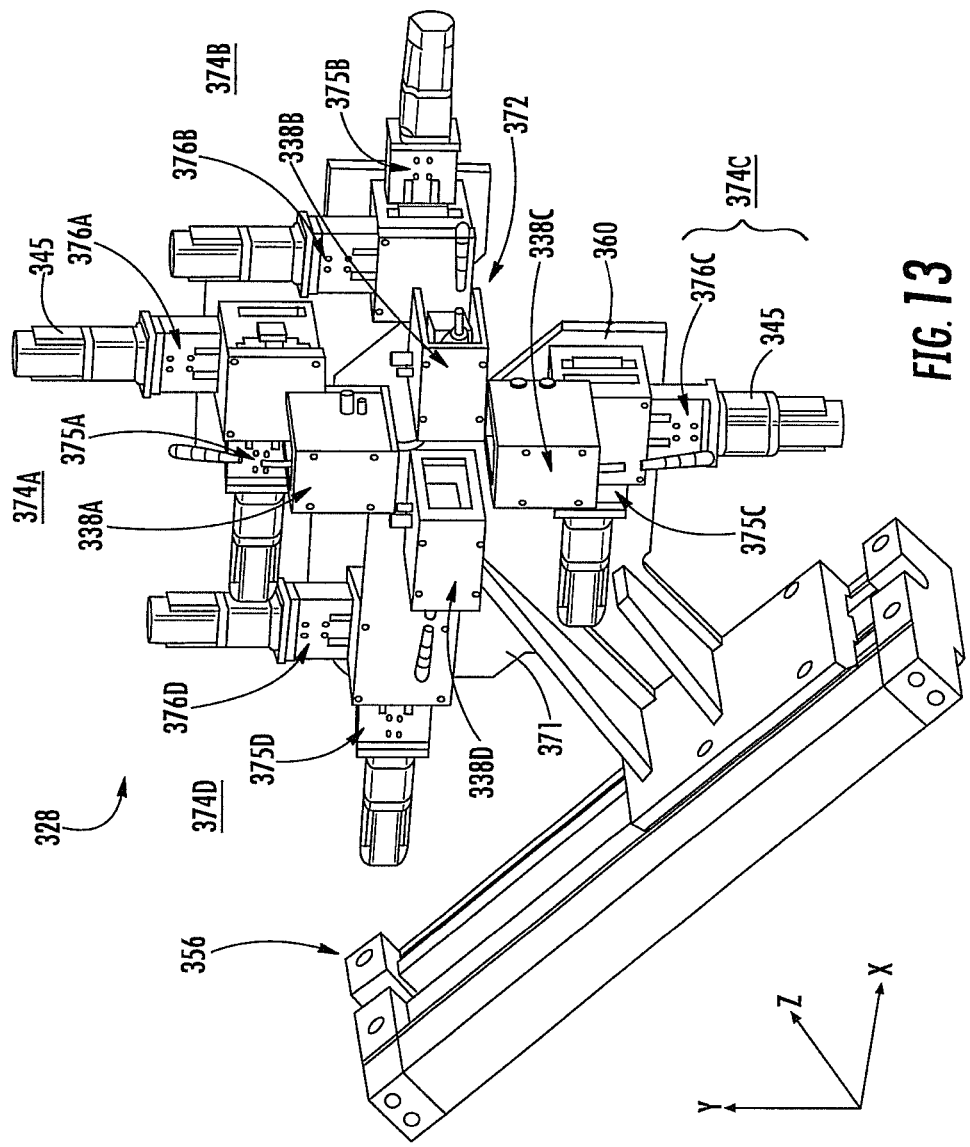
FIG. 13 depicts a perspective view of a displacement gauge assembly according to embodiments of the present disclosure.

Turning now to FIG. 13, the displacement gauge assembly 328 according to embodiments of the present disclosure will be described in greater detail. As shown, the plurality of gauges 338A-D may be directly mechanically coupled to a second side (i.e., a downstream side) 371 of the bracket 360. In some embodiments, the bracket 360 includes a cutout 372 so that the displacement gauge assembly 328 can be moved around the length of tubing without interference of the tubing on the draw line. As shown, each of the gauges 338A-D may be spaced equally about the length of tubing, for example 90 degrees apart.

The plurality of gauges 338A-D may be coupled to a plurality of adjustable gauge stages 374A-D, respectively. In some embodiments, each of the plurality of gauges 338A-D has a 50 mm focal point, and each of the plurality of adjustable gauge stages 374A-D are X-Y linear stages. The adjustable gauge stages 374A-D may be used to position the beam based on feedback from the first and second micrometers 322A-B. For example, the first and second micrometers 322A-B are aligned at zero and 90 degrees and measure position of the length of tubing. This allows for subsequent self-alignment of the plurality of gauges 338A-D, using the adjustable gauge stages 374A-D, when a tube diameter (product) change happens; no operator input is needed.

As shown, the adjustable gauge stages 374A-D include respective x-stages 375A-D coupled to y-stages 376A-D. The x-stages 375A-D allow movement of the plurality of gauges 338A-D along the x-direction, while the y-stages 376A-D allow movement of the plurality of gauges 338A-D along the y-direction. In some embodiments, the x-stages 375A-D and the y-stages 376A-D may be independently operated by one or more motors 345, which can receive movement signals/commands from a control system (e.g., the control system 135 and/or the control system 235).

Figure 14:
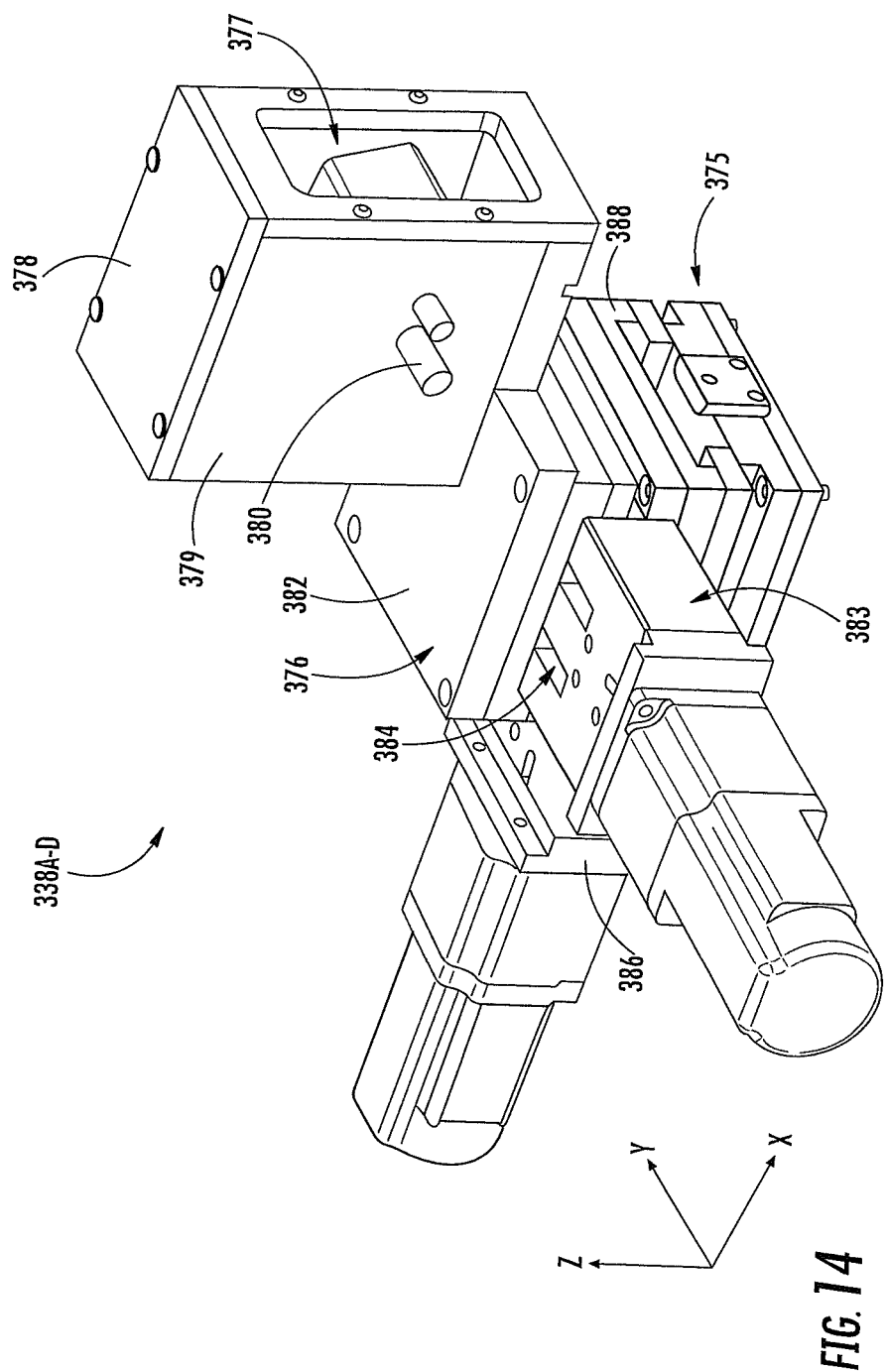
FIGS. 14-15 depict perspective views of a plurality gauges of the displacement gauge assembly of FIG. 13 according to embodiments of the present disclosure.
Figure 15:
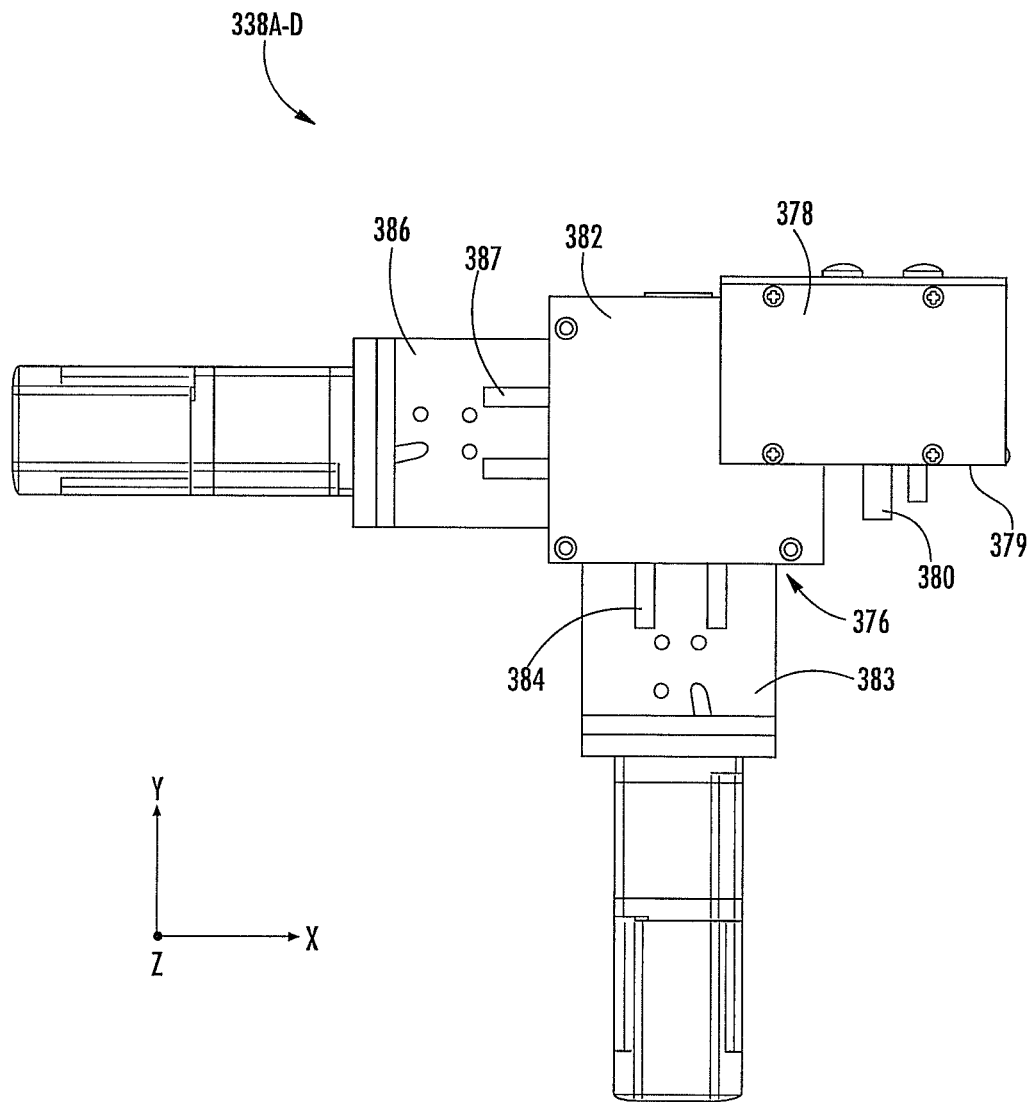

Turning now to FIGS. 14-15, the plurality of gauges 338A-D according to embodiments of the present disclosure will be described in greater detail. As shown, each of the plurality of gauges 338A-D may include a laser triangulation gauge head 377 partially enclosed within a head housing 378. The laser triangulation gauge head 377 may be directly mechanically coupled to a wall 379 of the head housing 378, for example, using one or more fasteners 380 extending through the wall 379. The head housing 378 is coupled to a first gauge sled 382 of the y-stage 376. In some embodiments, the y-stage 376 may include a y-platform 383 containing a series of grooves 384 extending along the y-direction. The first gauge sled 382 is configured to matingly engage with the grooves 384 of the y-platform 383, permitting the first gauge sled 382, and thus the head housing 378 and the laser triangulation gauge head 377, to slide along the y-direction.

The y-stage 376 may be further coupled to the x-stage 375. In some embodiments, the x-stage 375 may include an x-platform 386 containing a series of grooves 387 extending along the x-direction. A second gauge sled 388 is configured to matingly engage with the grooves 387 of the x-platform 386, permitting the second gauge sled 388, and thus the head housing 378, the laser triangulation gauge head 377, and the y-platform 383 to all slide along the x-direction.

The laser triangulation gauge head 377 measures the wall thickness of the length of tubing. In some embodiments, the laser triangulation gauge head 377 is optimal for use with glass tubing. For example, two (2) edges of the exterior surface of the length of tubing may be found as opposed to measuring displacement using only one edge detection. The laser triangulation gauge head 377 may include a beam width of 0.05 mm×2 mm, wherein the wide beam (2 mm) is perpendicular to the glass tube edge, normal laser spot triangulation gauge. During use, the x-y stages 375, 376 may automatically regulate a position of the laser triangulation gauge head 377 to maintain its laser at a peak of an arc along the circumference of the length of glass tubing. In some embodiments, x-y positioning is regulated based on the measurement of the OD at each of the first plurality of positions along the circumference of the length of glass tubing measured by the micrometer assembly.

Figure 16:
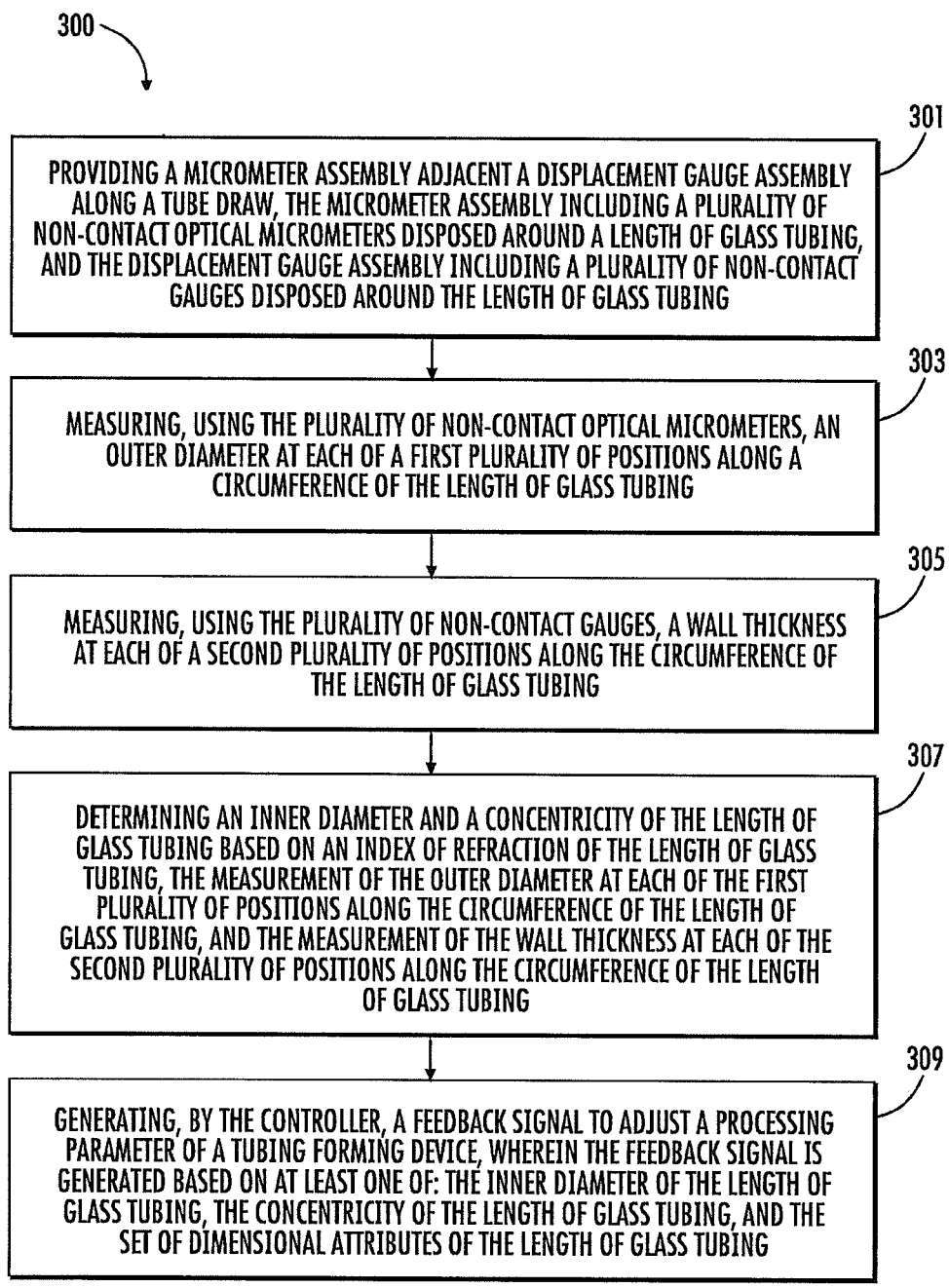
FIG. 16 is a process flow for measuring attributes of a length of tubing according to embodiments of the present disclosure.

Turning now to FIG. 16, a method 300 for measuring attributes of a length of tubing according to embodiments of the present disclosure will be described in greater detail. As shown, at block 301, the method 300 may include providing a micrometer assembly adjacent a displacement gauge assembly along a tube draw, the micrometer assembly including a plurality of non-contact optical micrometers disposed around a length of glass tubing. The displacement gauge assembly may further include a plurality of non-contact gauges disposed around the length of glass tubing.

At block 303, the method 300 may include measuring, using the plurality of non-contact optical micrometers, an outer diameter at each of a first plurality of positions along a circumference of the length of glass tubing. In some examples, a first non-contact optical micrometer may be coupled to a first micrometer stage, and a second non-contact optical micrometer may be coupled to a second micrometer stage, wherein the first non-contact optical micrometer and the second non-contact optical micrometer are positioned directly adjacent one another, and wherein the second micrometer stage is oriented at an angle, relative to the first micrometer stage, of approximately 45 degrees.

At block 305, the method 300 may include measuring, using the plurality of non-contact gauges, a wall thickness at each of a second plurality of positions along the circumference of the length of glass tubing. In some examples, each of the plurality of non-contact gauges may be arranged approximately 90 degrees apart from one another around the circumference of the length of glass tubing. In some examples, at least one of the plurality of non-contact gauges may be coupled to an adjustable gauge stage. In some examples, the method 300 may include automatically regulating a position of the adjustable gauge stage to maintain a laser of each of the plurality of non-contact gauges at a peak of an arc along the circumference of the length of glass tubing, wherein the position is regulated based on the measurement of the outer diameter at each of the first plurality of positions along the circumference of the length of glass tubing.

At block 307, the method 300 may include determining an inner diameter and a concentricity of the length of glass tubing based on an index of refraction of the length of glass tubing, the measurement of the outer diameter at each of the first plurality of positions along the circumference of the length of glass tubing, and the measurement of the wall thickness at each of the second plurality of positions along the circumference of the length of glass tubing. In some examples, the length of glass tubing is drawn through the micrometer assembly and the displacement gauge assembly along the tube draw. In some examples, the inner diameter and the concentricity of the length of glass may be determined at a plurality of predetermined intervals as the length of glass tubing is drawn through the micrometer assembly and the displacement gauge assembly. In some examples, the controller may determine a set of dimensional attributes of the length of glass tubing, the set of dimensional attributes including at least one of: an average wall thickness, a flow, a siding, an out-of-round, and a taper along an outer surface, wherein the flow is determined based on a line speed of the tube draw.

At block 309, the method 300 may include generating, by the controller, a feedback signal to adjust a processing parameter of a tubing forming device, wherein the feedback signal may be generated based on at least one of: the inner diameter of the length of glass tubing, the concentricity of the length of glass tubing, and the set of dimensional attributes of the length of glass tubing.

It will be appreciated that the method 300 may be executed using one or more processor components or controllers, such as the first controller 132 and 232, and the second controller 134 and 234, for executing one or more of blocks 301, 303 305, 307, and 309. Although the method 300 may depict a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. For example, a logic flow may be implemented by a processor component executing instructions stored on an article of manufacture, such as a storage medium. A storage medium may comprise any non-transitory computer-readable medium or machine-readable medium, such as an optical, magnetic or semiconductor storage. The storage medium may store various types of computer executable instructions, such as instructions to implement one or more disclosed logic flows. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The embodiments are not limited in this context.

In sum, at least the following technical advantages are achieved by the embodiments of the present disclosure. Firstly, the measurement system allows for non-contact of the glass of the length of tubing and the ability to measure 90 degree increments around the circumference of the tube while the tube is being drawn, or off line in tubing form. The plurality of measurements help determine OD, ID and wall thickness at 4 different locations on a clear glass tube. From these measurements, the control system may generate feedback on concentricity of OD and ID, wherein the measurement system and the control system are accurate to less than 5 μm with a repeatability of 3 μm.

Secondly, embodiments of the present disclosure allow measurements of the OD and wall thickness at multiple positions angularly distant from each other without rotation of the length of tubing. Prior art measurement systems typically require one or more rotations of the length of tubing for measurement of the wall thickness.

Thirdly, the measurement system may virtually align all of the measurements into one lengthwise location along the tube. As it is not physically possible to have all of the components of each measurement system at the same lengthwise location due to physical space constraints, the measurement data is advantageously aligned to a same circumferential ring as if all of the instruments are in the same physical location.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

As used herein, the singular forms "a," "an," and "the" are intended to include the plural forms as well, unless the context clearly indicates otherwise. It will be further understood that the terms "comprises" and/or "comprising," or "includes" and/or "including" when used herein, specify the presence of stated features, regions, steps elements and/or components, but do not preclude the presence or addition of one or more other features, regions, integers, steps, operations, elements, components and/or groups thereof.

For the sake of convenience and clarity, terms such as "top," "bottom," "upper," "lower," "vertical," "horizontal," "lateral," and "longitudinal" will be used herein to describe the relative placement and orientation of various components and their constituent parts. Said terminology will include the words specifically mentioned, derivatives thereof, and words of similar import.

Furthermore, in the following description and/or claims, the terms "on," "overlying," "disposed on" and "over" may be used in the following description and claims. "On," "overlying," "disposed on" and "over" may be used to indicate that two or more elements are in direct physical contact with each other. However, "on,", "overlying," "disposed on," and over, may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for measuring characteristics of a length of glass tubing, the method comprising: providing a micrometer assembly adjacent a displacement gauge assembly along a tube draw, the micrometer assembly including a plurality of non-contact optical micrometers disposed around the length of glass tubing and the displacement gauge assembly including a plurality of non-contact gauges disposed around the length of glass tubing;
measuring, using the plurality of non-contact optical micrometers, an outer diameter at each of a first plurality of positions along a circumference of the length of glass tubing;
measuring, using the plurality of non-contact gauges, a wall thickness at each of a second plurality of positions along the circumference of the length of glass tubing; and
determining an inner diameter and a concentricity of the length of glass tubing based on an index of refraction of the length of glass tubing, the measurement of the outer diameter at each of the first plurality of positions along the circumference of the length of glass tubing, and the measurement of the wall thickness at each of the second plurality of positions along the circumference of the length of glass tubing.

2. The method according to claim 1, further comprising:
drawing the length of glass tubing through the micrometer assembly and the displacement gauge assembly along the tube draw; and
determining, by a controller, the inner diameter and the concentricity of the length of glass tubing at a plurality of predetermined intervals as the length of glass tubing is drawn through the micrometer assembly and the displacement gauge assembly.

3. The method according to claim 2, further comprising:
determining, by the controller, a set of dimensional attributes of the length of glass tubing, the set of dimensional attributes including at least one of: an average wall thickness, a flow, a siding, an out-of-round, and a taper along an outer surface, wherein the flow is determined based on a line speed of the tube draw; and
generating, by the controller, a feedback signal to adjust a processing parameter of a tubing forming device, wherein the feedback signal is generated based on at least one of: the inner diameter of the length of glass tubing, the concentricity of the length of glass tubing, and the set of dimensional attributes of the length of glass tubing.

4. The method according to claim 1, further comprising:
coupling a first non-contact optical micrometer of the plurality of non-contact optical micrometers to a first micrometer stage; and
coupling a second non-contact optical micrometer of the plurality of non-contact optical micrometers to a second micrometer stage, wherein the first non-contact optical micrometer and the second non-contact optical micrometer are positioned directly adjacent one another along the tube draw, and wherein the second micrometer stage is oriented at an angle, relative to the first micrometer stage, of approximately 45 degrees.

5. The method according to claim 1, further comprising positioning each of the plurality of non-contact gauges approximately 90 degrees apart from one another around the circumference of the length of glass tubing.

6. The method according to claim 1, further comprising:
coupling at least one of the plurality of non-contact gauges to an adjustable gauge stage; and
automatically regulating a position of the adjustable gauge stage to maintain a laser of each of the plurality of non-contact gauges at a peak of an arc along the circumference of the length of glass tubing, wherein the position is regulated based on the measurement of the outer diameter at each of the first plurality of positions along the circumference of the length of glass tubing.

\* \* \* \* \*